April 12, 1966     M. VON ARDENNE     3,245,251
ULTRASONIC DIAGNOSTIC TESTING APPARATUS
Filed March 2, 1962                             3 Sheets-Sheet 1

INVENTOR
MANFRED V. ARDENNE

April 12, 1966  M. VON ARDENNE  3,245,251
ULTRASONIC DIAGNOSTIC TESTING APPARATUS
Filed March 2, 1962  3 Sheets-Sheet 2
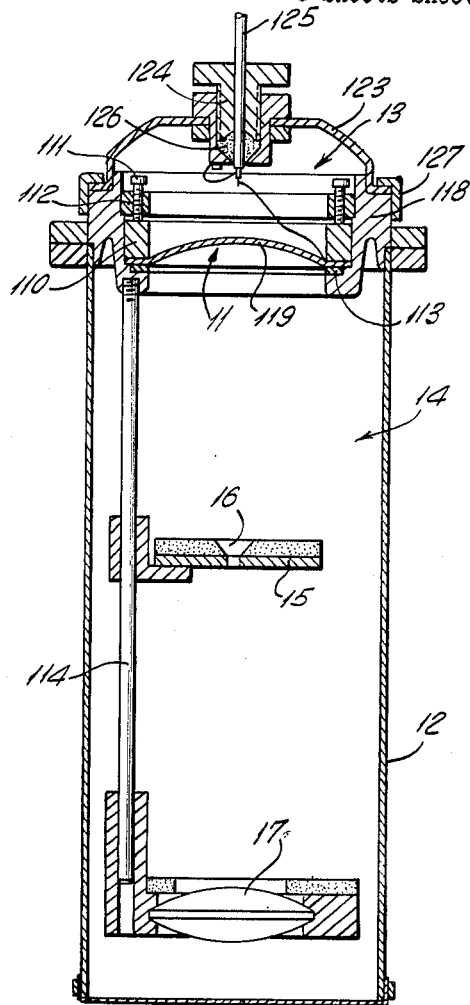
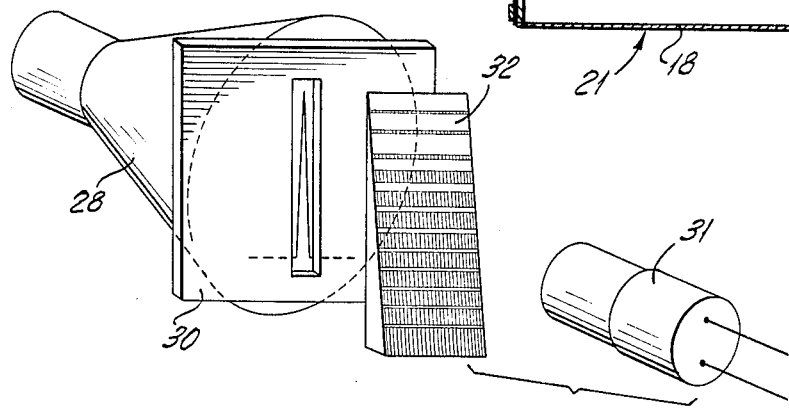
INVENTOR
MANFRED V. ARDENNE

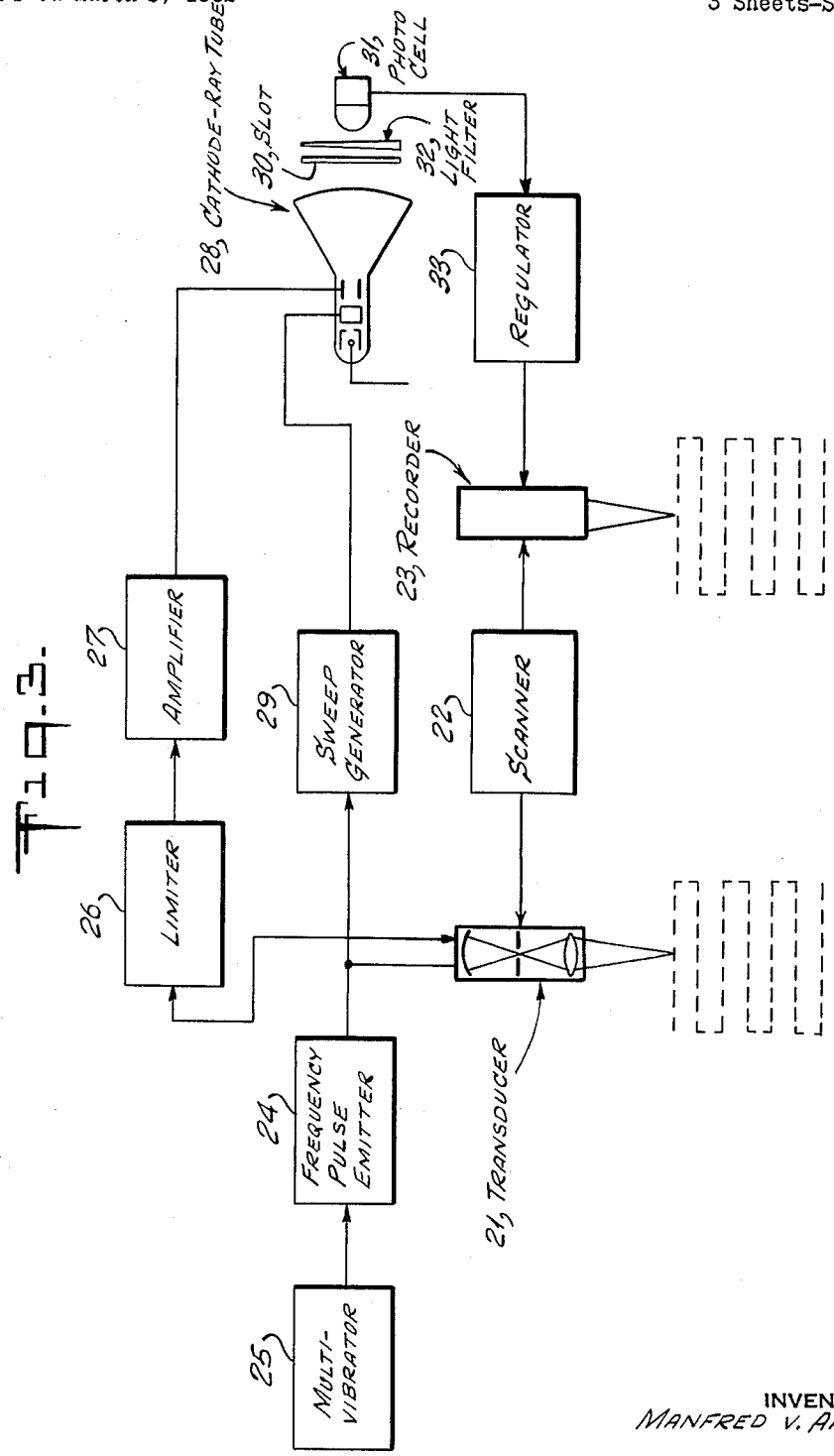

United States Patent Office

3,245,251
Patented Apr. 12, 1966

3,245,251
ULTRASONIC DIAGNOSTIC TESTING APPARATUS
Manfred von Ardenne, Dresden-Weisser Hirsch, Germany, assignor to VEB Transformatoren- und Rontgenwerk, Dresden, Dresden, Germany
Filed Mar. 2, 1962, Ser. No. 177,062
2 Claims. (Cl. 73—67.9)

The present invention relates to an ultrasonic diagnostic testing apparatus and, in particular, to such an apparatus where an ultrasonic beam is used for echo sounding human tissues, and the resulting echoes are separately recorded as to their travel time which corresponds to the depth at which they were reflected.

In prior-art apparatus of ultrasonic diagnosis, two principles may be distinguished. According to the first principle, the variations in the transmission of the ultrasonic waves are the basis for the diagnosis, while according to the second principle, the reflections are relied on for the diagnosis. The first method is usually referred to as the transmission method and the second as the echo method.

It is also known to use a separate transmitter and receiver for the echo method, to place them one adjacent to the other and couple each to the body to be investigated. However, for pulse operation, the transmitter is usually also used as the receiver.

Frequencies of the order of 2 megacycles up to 15 megacycles have been used. The use of ultrasonic lens systems for the focusing of the ultrasonic rays is also known, and so are spherical convergence type vibration transducers which concentrate the ultrasonic beam onto a very small predetermined region of the tissue, and which are also used to receive the echo pulses.

In known apparatus, the ultrasonic echoes are converted into proportional voltages which are fed, for instance, to an oscillograph or oscilloscope. The time axis deflection of the cathode-ray tube is synchronized with the pulse recurrence frequency.

Alternatively, the ultrasonic transmitter is guided in lines along the tissue to be examined and the returned echoes control the intensity of an electron beam of a cathode-ray tube, while the beam deflection is synchronized with the transmitter displacement. These apparatus record an ultrasonic image. However, in most instances, difficulties arise in this type of equipment due to the plurality of echo pulses, usually of different intensities, which are due to the layer structure of the tissues and to multiple reflections.

The present invention is concerned with ultrasonic diagnostic equipment and particularly with testing apparatus, which use the echo sounding principle. The same transducer is preferably used as a transmitter and as a receiver. A spherical convergence type vibration transducer may be used to concentrate the ultrasonic beam onto a very small predetermined region of the tissue under examination. The received echo pulse is converted into a corresponding voltage pulse which controls a deflection of an electron beam of a cathode-ray tube; the other electron-beam deflection is synchronized with the pulse recurrence frequency.

It is the principal object of the present invention to provide an image of a predetermined thin layer of the tissue under examination.

It is a further object of the present invention to provide a testing apparatus which permits the distinction of pulses received from different depths, but the same location of the tissue under investigation.

It is another object of the present invention to present a dimensional image of the tissue under investigation, which image represents the area underlying a predetermined path along the tissue.

It is still another object of the present invention to eliminate reflections and dispersions from regions, other than the immediate region to be examined, from being overlappingly recorded. In particular, reflections from only a limited depth interval are displayed.

It is a further object of the present invention to use ultrasonic waves of one millimeter wavelength or less and to focus the ultrasonic beam onto areas of the order of one or only a few millimeters.

For this purpose, the invention uses the known expedient of providing a gaseous medium at the rear of a transducer and a liquid in front of the same. Further, a diaphragm with a small opening is positioned at the point of convergence of the ultrasonic beam, and spaced from the diaphragm is an ultrasonic convergence lens which images or projects the diaphragm aperture onto the region of the tissue under investigation.

The pulse selection and the intensity control may be improved by controlling a photocell by the fluorescence due to the echo pulses, as is known in the art. The photocell receives the light through masking means including a slot which extends in the direction indicative of the intensity of the echo pulses and which corresponds in width to the time-delay interval equivalent to the depth interval under investigation. A graded light filter is interposed between the fluorescent screen and the photocell to control the intensity of the picture elements. The graded light filter permits more light to impinge on the photocell for larger deflections of the beam corresponding to the intensity of the echo pulses. Thus, the amount of light received by the photocell is a measure for the intensity of the reflected ultrasonic beam.

Further, an apparatus as known in the art guides the ultrasonic-beam focal point in parallel lines along the tissue area to be examined. The relative motion between the body and the ultrasonic equipment results in a line-by-line scanning of a desired area. The location of a writing point in an image recorder is synchronized with this scanning motion.

Further objects and advantages of the present invention will become apparent from the following description taken in conjunction with the figures, in which:

FIG. 2 is a sectional view of a specific embodiment of the inventive apparatus, similar to FIG. 1;

FIG. 3 is a block diagram illustrating the operative connection of the ultrasonic diagnostic apparatus according to the invention; and FIG. 4 is a perspective, somewhat schematic view of certain elements of the diagnostic arrangement shown in FIG. 3.

Figure 1:
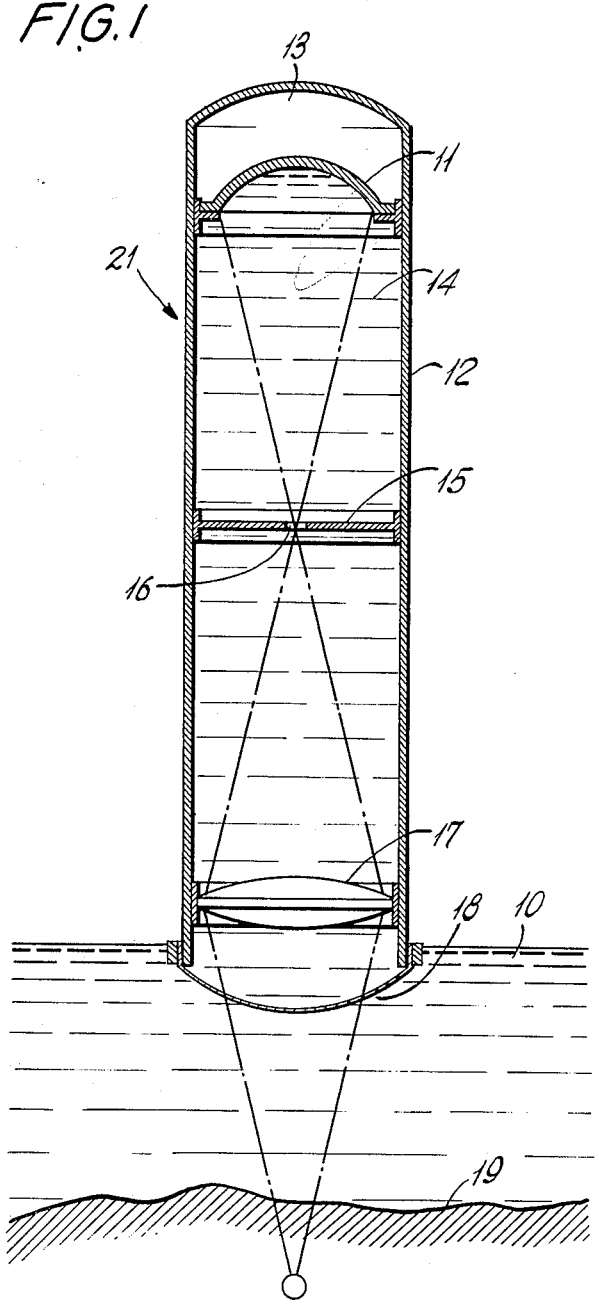
FIG. 1 is a schematic illustration of an ultrasonic diagnostic testing apparatus according to the present invention.

In FIG. 1, the transducer system is schematically shown and generally designated 21. In this figure, reference is made to a conventional spherical convergence-type transducer 11 which operates both as transmitter and as receiver; this may be a barium titanate vibration transducer having a frequency of betweeen 2 and 40 megacycles. Transducer 11 is mounted inside and close to one end of a preferably cylindrical housing 12. A gaseous medium 13, such as air, contacts the side of transducer 11 which faces away from the body under examination, and a liquid medium 14, for instance water, contacts the side of transducer 11 which faces towards the body under examination.

A disc-shaped diaphragm 15 is arranged in the focal plane of transducer 11. An aperture 16 of diaphragm 15 has a diameter of the order of one millimeter. An ultrasonic lens 17, which is a poor reflector, is mounted close to the other end of housing 12, which lens 17 presents a point image of aperture 16 of the diaphragm 15 at a predetermined depth of the body to be studied. Housing 12 is closed by a foil 18.

The human body to be examined, as a matter of example, is designated as 19. The instrument is coupled to the body by a layer of liquid 10, for instance water. The ultrasonic beam reflected by the object 19 is focused during the return path onto aperture 16 of diaphragm 15 by the same ultrasonic lens 17. The supersonic beam impinges on the barium-titanate vibration transducer which is connected to operate as an acoustic microphone to supply the control voltage for a cathode-ray tube (see FIGS. 3 and 4).

It is the advantage of this arrangement that the beam reflected and dispersed in areas surrounding the focal point is attenuated to a large extent. This reduced intensity results from the fact that the ultrasonic lens 17 does not focus these parts of the radiation within the plane of diaphragm 15, but either before or behind diaphragm 15. The attenuation of this undesired radiation increases with the opening ratio of lens 17.

Further, the beam reflected in the focal plane of the echoes for which the time delay corresponds to the time investigated body is selected by recording only those interval required for the pulse to travel to a predetermined depth and to return from there.

For this purpose, the echo-pulse output of ultrasonic transducer 11 is fed to a cathode-ray tube which is synchronized with the pulse recurrence frequency. The region corresponding to the time delay of the studied area is selected by a slot extending in the direction of the echo intensity deflection. The echo fluorescence thus selected on the C.R.T. screen controls the brightness of an image by means of a photocell apparatus. These and other features of the inventive arrangement will be more fully described somewhat later with regard to FIGS. 3 and 4.

A graded light filter is inserted between the fluorescent screen and the photocell, which permits increased amounts of light to reach the photocell as the echo pulse intensity increases.

It is also known to move the beam focus periodically and line-by-line over the tissues to be studied. The relative motion of the ultrasonic instrument and the body results in a linear scanning of an area on the body. The position of a writing spot of an image-producing instrument is synchronized with this scanning motion of the ultrasonic testing apparatus.

A specific embodiment of the inventive apparatus, based on the schematic showing of FIG. 1, is illustrated in FIG. 2. The cylindrical housing 12 is in the shape of a tube having a wall thickness of approximately 5 millimeters and being made of polyvinyl chloride or a similar material. The lower end of the housing is closed by the foil 18. The upper end of housing 12 is provided with a closure 123 carrying the following elements: a duct 124 for a high-frequency cable 125, a rubber gasket 126 and a mount 127 for the attachment of the cover.

The transducer, generally designated 11, comprises a holding ring 118 for a spherical convergence-type transducer element 119. The latter is clamped within the system with the aid of a thrust collar 110 made of an insulating material, by means of setscrews 111 passing through a ring 112. The transducer element 119 rests on a gasket 113. Ring 118 also carries a guide rod 114 on which the diaphragm 15 and the ultrasonic lens system 17 are slidably attached.

The block diagram of FIG. 3 illustrates the electrical interconnection of the various elements in the inventive ultrasonic diagnostic apparatus. The transducer system 21 (see FIGS. 1 or 2) is coupled to the moving part of an image-recording device 23 over a scanning mechanism 22. Owing to this arrangement, the writing spot always corresponds to the position of the transducer system on the scanned surface at a given time.

As a matter of example, the image-producing or recording device 23 may comprise, in a manner known per se, photographic paper or film as the image carrier; the light-sensitive material is introduced and a light bulb masked with a shield or diaphragm is guided thereover. The bulb is fed by a brightness-regulating device 33 which, in turn, is controlled by a photocell 31.

The transducer system 21 is excited by a high-frequency pulse emitter 24 driven by a multivibrator 25. Upon return of the echo pulses, there are again converted into voltage pulses in the transducer system 21. These pulses are applied to the vertical deflection plates of a cathode-ray tube 28 by way of a limiter 26 and an intercalated amplifier 27, as shown in FIG. 3. The purpose of the limiter is to protect the amplifier from overload by the emitter pulses.

While the cathode-ray is deflected in the $y$ direction by the voltage pulses obtained from the echoes, their deflection in the $x$ direction results from the action of a sweep-voltage generator 29, in a manner known in the art of C.R.T. circuits.

In order positively to exclude echoes emanating from other, unwanted zones from being evaluated, a slot diaphragm oriented in the $y$ axis is arranged in front of the cathode-ray tube 28. The slot diaphragm, designated 30, is schematically shown in FIG. 3 and with some detail in FIG. 4. The width of the slot corresponds to the thickness of the tissue layer being examined, in conformity with the deflection velocity in the $x$ direction.

A graded light filter 32 is arranged between the slot diaphragm and the photocell 31 (FIGS. 3 and 4). The gradual transmission of filter 32 is such that the light of the C.R.T. screen is greatly attenuated when deflection from the $x$ axis is small. On the other hand, when deflection is of a high order, i.e., when the incoming echo pulses have high intensities, the light is only slightly attenuated or is not influenced at all. Since the voltage controlled by the photocell is directly proportional to the light impinging thereon, the result is that the image recorder 23 strongly illuminates the record produced therein (paper or film document of the diagnostic investigation). The record will thus be darkened in those places and at those moments when the echo has a high intensity, and vice versa.

The result is an echo image having a high proportion of intermediate tonal values between black and white, thus permitting conclusions to be drawn regarding the intensity of the received echo pulses. It should be noted that the necessity to combine the novel vibration transducer with an image recorder as described herein results from the requirement to obtain a sectional or layer image composed of graduated intermediate tonal values and having a high degree of resolution.

A few additional considerations and explanations seem to be in order with regard to certain operational features of the inventive method and apparatus for ultrasonic diagnosis. Thus, it is not only the presence or absence of a reflecting spot, or echo pulse emanating therefrom, which should be indicated, but also its intensity in intermediate (gray) tone graduations. Without the use of the graded light filter the photocell would generate a constant voltage when hit by the incoming echo pulses, and regardless of their intensity, because with greater deflections the light ray becomes less bright. Without a graded light filter it is, therefore, impossible to obtain an image having intermediate tone values.

The longitudinal dimensions of the masking or slot diaphragm are so chosen that even the longest echo can be recorded. The diaphragm can thus be provided in the form of two simple plates. It is, however, desirable to arrange the slot diaphragm in such a manner that the zero line in the $x$ axis is also masked by it.

Only the echoes emanating from the examined depth layer should be shown in the diaphragm slot. The depth is determined by the position of the slot on the $x$ axis because the latter is the time-delay axis. It will be understood by those skilled in the art that a predetermined distance traveled by the waves and/or the corresponding echoes can be correlated with a given time delay. The width of the slot diaphragm thus also determines the thickness of the object layer from which the echoes are to be registered.

It is intended that all matter contained in the above description or shown in the accompanying drawings shall be interpreted as illustrative and not in a limiting sense.

What is claimed is:

1. A diagnostic testing apparatus comprising a transducer for transmitting and receiving ultrasonic pulses, a cathode-ray tube having two pairs of deflection systems and a screen, the transmitted pulses synchronizing the voltage applied to a first pair of said deflection systems, the received pulses controlling the voltage applied to a second pair of said deflection systems, masking means positioned in front of said screen and having a slot of predetermined width, the length of said slot extending in the direction of the deflection due to said second pair of deflection systems and indicative of the intensity of said received pulses, a light filter positioned in front of said masking means and being density graded in the direction of said length of the slot, and light-sensitive means receiving light from said screen after passage through said slot and said filter.

2. A diagnostic testing apparatus as defined in claim 1, wherein said light-sensitive means includes recording means, and further comprising means for guiding said transducer along a predetermined path and for simultaneously controlling said recording means to follow a corresponding path.

References Cited by the Examiner

UNITED STATES PATENTS

| | | | |
|---|---|---|---|
| 2,532,507 | 12/1950 | Meunier | 310—8.7 |
| 2,602,102 | 7/1952 | Webb | 310—8.7 |
| 2,603,966 | 7/1952 | Drake | 73—67.9 |
| 2,699,061 | 1/1955 | Drake | 73—67.9 |
| 2,763,153 | 9/1956 | Simjian | 73—67.8 |
| 2,984,098 | 5/1961 | Loos | 73—67.9 |
| 3,014,091 | 12/1961 | McLean. | |

OTHER REFERENCES

Kikuchi et al.: "Early Cancer Diagnosis Through Ultrasonics," Journal Acoustical Society America, volume 29, No. 7, July 1957, pages 824–833.

Reid et al.: "Ultrasonic Echo-Ranging for Tissue Diagnostic Studies," IRE Convention Record, part 9, 1955, pages 68–74.

RICHARD C. QUEISSER, *Primary Examiner.*

JOHN P. BEAUCHAMP, ROBERT L. EVANS, C. A. RUEHL, *Assistant Examiners.*